United States Patent [19]

Chen et al.

[11] Patent Number: 4,707,617

[45] Date of Patent: Nov. 17, 1987

[54] WINDMILL APPARATUS

[75] Inventors: Muh-Juh Chen, 5-3 Fl., No. 11, Lane 322, Wu-Fel St.; Li-Ming Hwang, both of Tainan, Taiwan

[73] Assignee: Muh-Juh Chen, Tainan, Taiwan

[21] Appl. No.: 945,676

[22] Filed: Dec. 23, 1986

[51] Int. Cl.⁴ .............................................. F03D 7/06
[52] U.S. Cl. ........................................ 290/55; 290/44; 416/17; 416/119
[58] Field of Search ................. 290/44, 55; 416/9, 17, 416/141, 156, 159, 162, 119

[56] References Cited

U.S. PATENT DOCUMENTS

| | | | |
|---|---|---|---|
| 3,902,072 | 8/1975 | Quinn | 416/119 |
| 4,057,270 | 11/1977 | Lebost | 290/55 |
| 4,494,007 | 1/1985 | Gaston | 290/55 |
| 4,609,827 | 9/1986 | Nepple | 290/55 |

*Primary Examiner*—Bernard Roskoski

*Attorney, Agent, or Firm*—Cushman, Darby & Cushman

[57] ABSTRACT

A windmill apparatus includes: a frame body structure adapted to be positioned on a flat top of a construction; a main shaft vertically installed in the middle of the frame body structure; a first main-shaft sleeve rotatably coupled with a lower part of the main shaft; a belt pulley fixed around a lower end of the first main-shaft sleeve; a rotation control device with a revolving arrangement rotatably installed around the first main-shaft sleeve; a direction control device installed in a closed upper portion of the frame body structure and mechanically coupled with the rotation control device for automatically effecting wind direction change; and a wind direction indicating device rotatably installed on top of the frame body structure and movably coupled with the direction control device for relaying wind direction change therefrom; thereby, wind force can be effectively utilized with minimal manufacturing cost.

7 Claims, 9 Drawing Figures

WINDMILL APPARATUS

BACKGROUND OF THE INVENTION

This invention relates to a windmill apparatus, particularly to a sail-type windmill apparatus, which features a simplified structure with effective wind catching performance.

The known propeller-type windmills, through effective in utilization, are expensive in manufacturing cost and complex in structure. The anemometer-type windmills, though cheap for manufacturing, are ineffective in utilization. In addition, the structure of the known anemometer-type windmills usually includes a pair of hemespherical cups mounted in opposite direction on a vertical shaft. With the arrangement of the cups, when one of them is driven backward away from the wind, another one is moved forward against the wind so that, owing to the different wind pressure applied on the concave and the convex areas of the cups, the vertical shaft is rotated to drive a machine mechanically connected thereto through the turning of the cups. However, since the hemispherical cups incurs a good deal of resistance whenever they are moved forward against the wind, operational efficiency is therefore reduced.

SUMMARY OF THE INVENTION

It is accordingly a primary object of this invention to provide a simplified windmill apparatus which overcomes the problems associated with the prior art.

This and other objects are achieved by providing a simplified windmill apparatus, which includes: a frame body structure adapted to be positioned on a flat top of a construction such as a building; a main shaft vertically installed in a middle position of the frame body structure; a first main-shaft sleeve rotatably coupled with a lower portion of the main shaft; a belt pulley fixed around a lower end of the first main-shaft sleeve for being used to drive an associated machine; a rotating device having a revolving arrangement movably disposed therein rotatably installed around the first main-shaft sleeve in connection with the belt pulley; a second main-shaft sleeve rotatably coupled with an upper portion of the main shaft; a direction control device having a reversible motor and a power supply system provided therein installed on top of the rotating device and mechanically connected to revolving arrangement through the second main-shaft sleeve for automatically adjusting the revolving arrangement according to the wind direction; and a wind direction indicating device horizontally installed on top of the direction control device and movably coupled with the power supply system of the direction control device; thereby, wind force can be effectively utilized with minimal manufacturing cost.

Other advantages and characteristics of the invention will become clear from the following detailed description of a preferred embodiment when read in conjunction with the accompanying drawings.

DETAILED DESCRIPTION OF THE PREFERRED EMBODIMENT

Figure 1:
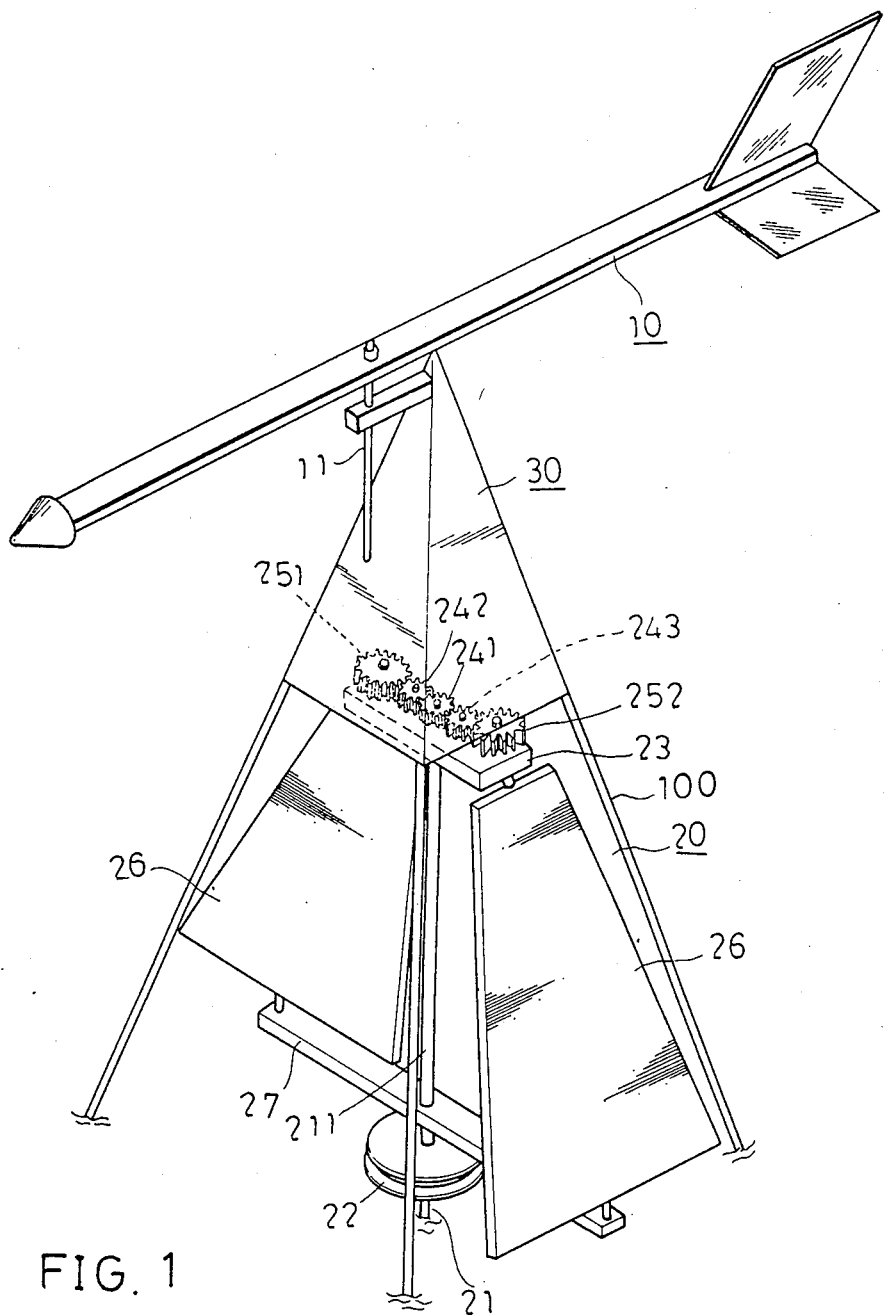
FIG. 1 is a perspective view of a preferred embodiment of a windmill apparatus according to this invention.
Figure 2:
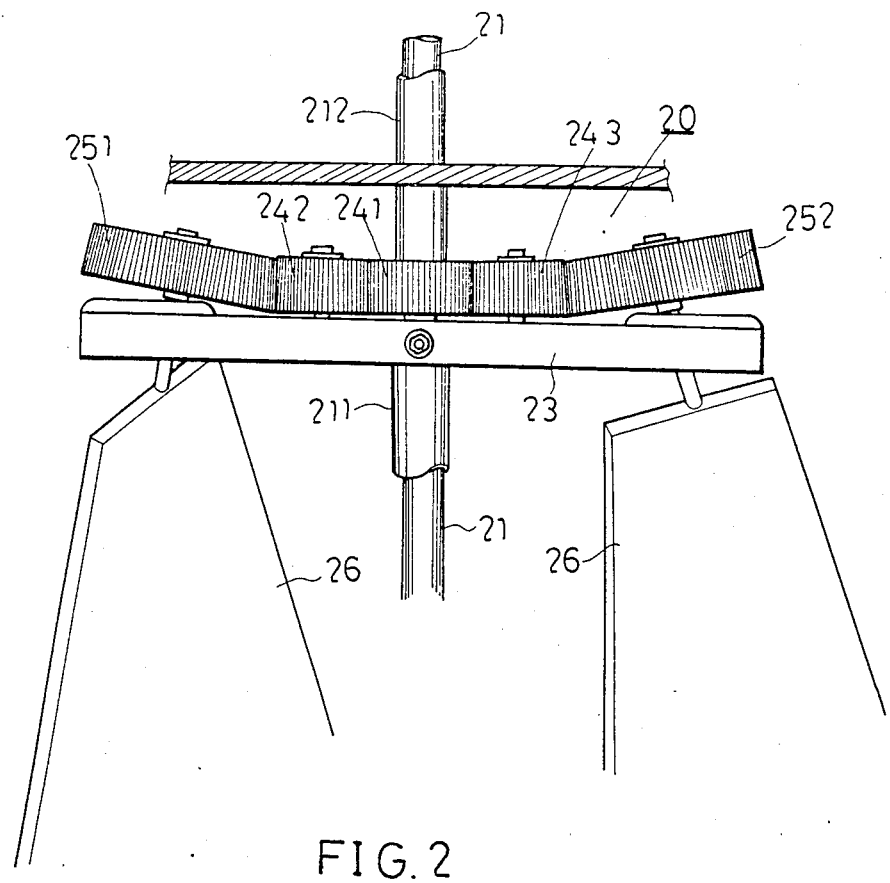
FIG. 2 is a partially enlarged perspective view of a rotating device of the preferred embodiment shown in FIG. 1.

Referring to FIGS. 1 and 2, the preferred embodiment of a windmill apparatus according to this invention comprises: a frame body structure 100 adapted to be positioned on a flat top surface of a construction such as a building; a main shaft 21 vertically installed in a middle portion of the frame body structure 100; a first main-shaft sleeve 211 rotatably coupled with a lower part of the main shaft 21; a belt pulley 22 fixed around a lower end of the first main-shaft sleeve 211 for being used to drive an associated machine; a rotating device 20 movably installed in a lower open portion of the frame body structure 100 around the first main-shaft sleeve 211; a second main-shaft sleeve 212 movably coupled with an upper part of the main shaft 21 over the first main-shaft sleeve 211; a direction control device 30 disposed in an upper closed portion of the frame body structure 100 and rotatably connected to the rotating control device 20 through the second main-shaft sleeve 212; and a wind direction indicating device 10 movably installed on top of the frame body structure 100 and mechanically connected to the direction control device 30.

As can be seen in FIGS. 1 and 2, the rotating device 20 installed in the lower portion of the frame body structure 100 according to this invention comprises: a first main-shaft sleeve 211 movably coupled with a lower portion of the main shaft 21; a belt pulley 22 fixed around a lower end of the first main-shaft sleeve 211; a lower anchoring member 27 horizontally fastened around the lower part of the first main-shaft sleeve 211 over the belt pulley 22; an upper anchoring member 23 fixed on an upper part of the first main-shaft sleeve 211; a second main-shaft sleeve 212 movably coupled around an upper portion of the main shaft 21, as shown in FIG. 2; a first gear 241 fixed around a lower end of the second main-shaft sleeve 212 and located over the middle area of the upper anchoring member 23; a second and a third gear 242 and 243, of which the number of the gear teeth are identical to that of the first gear 241, installed on the upper anchoring member 23 and respectively meshed with the first gear 241 on the opposing sides thereof at a straight-line position; a fourth and a fifth gear 251 and 252, of which the number of the gear teeth doubles that of the second and the third gears 242 and 243, disposed on the opposite end portions of the upper anchoring member 23 and respectively meshed with the second and the third gears 242 and 243 at an upward inclined position; and a pair of revolving blades 26 each having its upper end fixed on the gear shafts of the fourth and the fifth gears 251 and 252 at a vertical position below the upper anchoring member 23 and its lower end rotatably connected to the lower anchoring member 27 at the opposing end thereof. It shall be appreciated that the two revolving blades 26 are arranged in such a way that the faces of the blades 26 are always perpendicular to each other so that when one of them is in parallel with the wind direction indicating device 10, the other one is perpendicular to it.

Figure 3A:
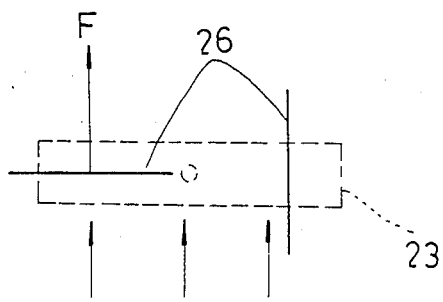
FIG. 3 (A), (B), (C) are illustrations indicating the moving conditions of the revolving blades against the wind.
Figure 3B:
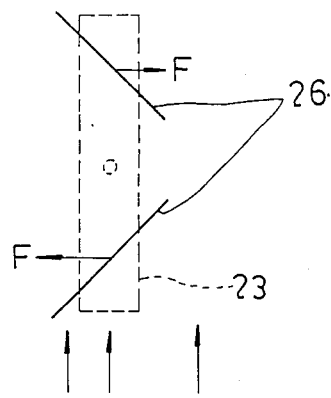
Figure 3C:
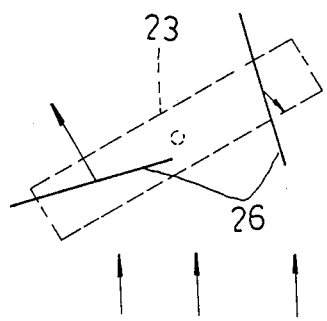

The combined rotating device 20, together with the direction control device 30 and the wind direction indicating device 10 (for which detailed description will be made later), can be positioned on a flat top surface of a construction (such as on top of a building) where wind is blowing regularly, and the rotating condition of the revolving blades 26 is as shown in FIGS. 3 (A), (B) and (C). When wind blows in the direction the arrowhead shows in FIG. 3(A), the revolving blades 26, of which one is facing the wind with its front surface while the other facing the wind with its side edge, together with the first main-shaft sleeve 211, the upper anchoring member 23 and the lower anchoring member 27, will rotate clockwise, and thereby driving the belt pulley 22 to turn around the main shaft 21 so as to drive a machine associated therewith. In this condition, as the first gear 241 is held in a stationary position by the direction control device 30 above, the second and the third gears 242 and 243 respectively meshed with the first gear 241, together with the fourth and fifth gears 251 and 252 which are separately meshed with the second and third gears 242 and 243 and respectively connected to the upper ends of the revolving blades 26, are moved in a line along with the upper anchoring member 23 and the lower anchoring member 27, together with the first main-shaft sleeve 211, around the main shaft 21 with the second and third gears 242 and 243 respectively rotating around the periphery of the first gear 241. When the revolving blades 26 are moved to a position as respectively shown in FIGS. 3(B) and 3(C), the wind-receiving angle of each revolving blade 26 is also changed, each having a distributed force F generated in pependicular direction to the front surface thereof. This distributed force F is the effective force for driving the windmill apparatus. Therefore, no matter at which angle the revolving blades 26 are turned, both of them can efficiently arrest the wind force so as to drive the belt pulley 22 in performing effective work for a machine operatively associated therewith.

Figure 4:
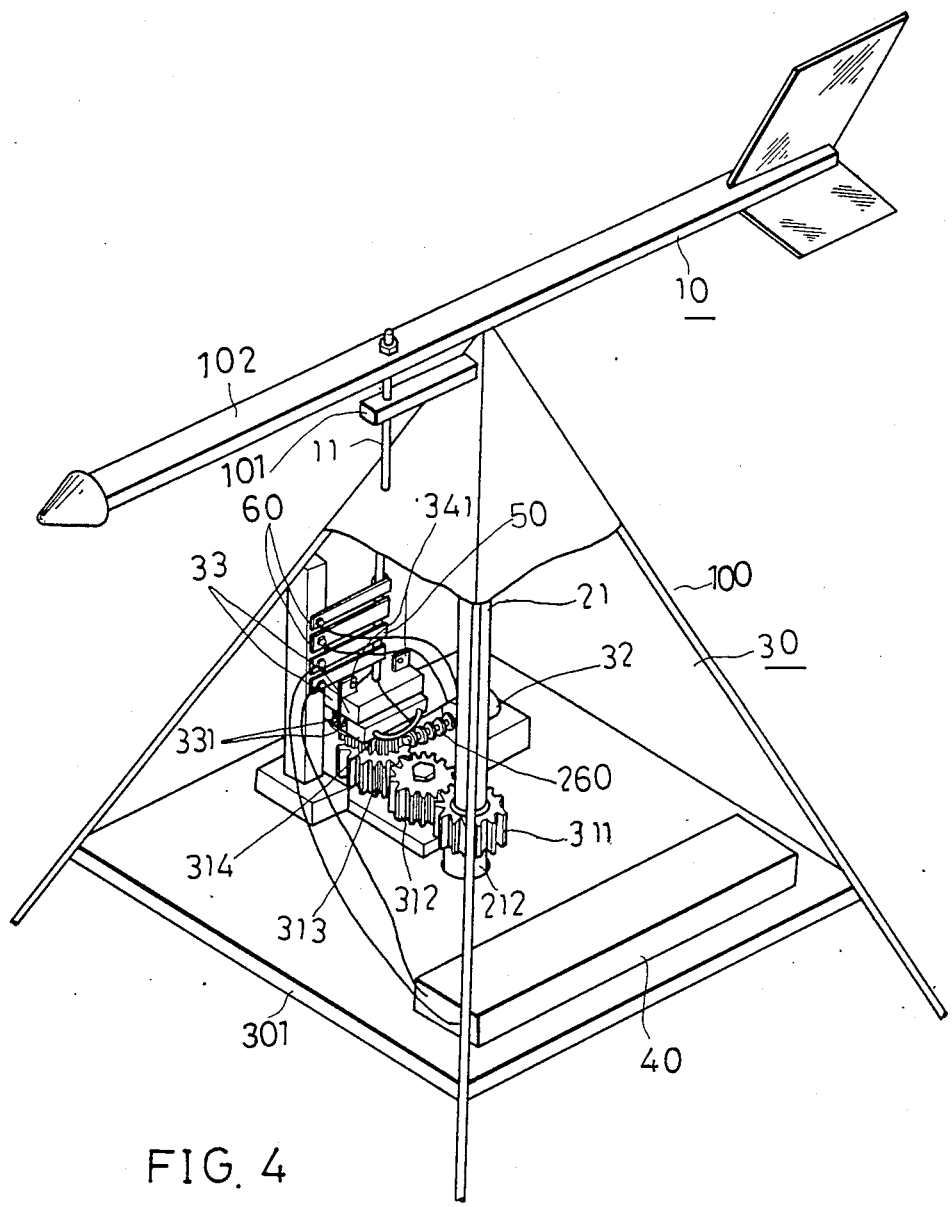
FIG. 4 is an enlarged perspective view of a rotating device of the preferred embodiment shown in FIG. 1.

Referring to FIGS. 2 and 4, in order to enable the rotating device 20 to be timely adjusted into alignment with the wind direction indicated by the wind direction indicating device 10, a direction control device 30 is installed in an upper closed portion of the frame body structure 100 over the top of the rotating device 20. As shown in FIG. 4, the direction control device 30 comprises: a sixth gear 311 fixedly connected to a top end of the second main-shaft sleeve 212, which extends from the rotating device 20 through an opening of a base member 301 of the direction control device 30; a seventh gear 312 and an eighth gear 313 provided side by side on the base member 301 and respectively meshed with the sixth gear 311 and the seventh gear 312, wherein the number of gear teeth of all the gears 311, 312, and 313 are identical to one another; a counter gear 314 coaxially connected to the eighth gear 313 and meshed with a worm shaft 260, which is coupled with a reversible motor 32 installed on the base member 301; a pair of insulated blocks 33 each having a pair of electric contact protuberances 331 separately disposed on one side thereof spacingly provided on top of the counter gear 314 with each pair of the electic contact protuberances 331 located opposite to each other and electrically connected to a DC power source 40 through a first pair of terminals 50 of the direction control device 30, wherein one pair of the electric contact protuberances 331 in one insulated block 33 are connected to a positive terminal and the other pair of the electric contact protuberances 331 of another insulated block 33 connected to a negative terminal of the power source 40; an insulated moving member 34 provided on top of the insulated blocks 33 and fixed onto a lower end of a shaft member 11 of the wind direction indicating device 10; and a pair of electric conductive pieces 341 vertically disposed in the oppossing ends of the moving member 34 and respectively connected to a second pair of terminals 60 of which the positive and the negative are respectively connected to the related electrical terminals of the reversible motor 32.

The wind direction indicating device 10 includes: a supporting member 101 fixed on a top part of the frame body structure 100 at one end; a shaft member 11, of which the lower end is connected to the moving member 34 of the rotation control device 30, rotatably engaged with and through another end of the supporting member 101 with the upper end of the shaft member 11 extending over the top end of the frame body structure 100; and a wind indicating member 102 horizontally connected to the upper end of the shaft member 11. Therefore, when the direction of the wind direction indicating member 102 is changed along with the change of wind, the shaft member 11 will also be moved along with the insulated moving member 34, causing the electric conductive pieces 341 to respectively make electrical contact with the electric contact members 331 so as to close the motor power circuit in either contact sequence (positive - negative or negative - positive) according to the moving direction of the wind direction indicating device 10. As a result, the reversible motor 32 will be started to run in the direction dictated by the electrical conductive pieces 341 being in contact with the electric contact members 331. As the motor starts to run, transmission starting from the worm shaft 260 will be in the following sequence: counter gear 314 - eighth gear 313 - seventh gear 312 - sixth gear 311 - second suporting sleeve 212 - first gear 241 - second and third gears 242, 243 - fourth and fifth gears 251, 252 - respective revolving blades 26, so that the revolving blades 26 will be turned to the most primium position for arresting the wind along with the change of the wind direction indicating device 10. It shall be appreciated that once the rotation control device 30 has moved to a proper position, the electrical conductive pieces 341 will also be moved along with the insulated moving member 34 to a position from which contact with the electric contact members 381 is disengaged. Thus, the motor power circuit of the reversible motor 32 is open, and the motor stops running accordingly.

Figure 5:
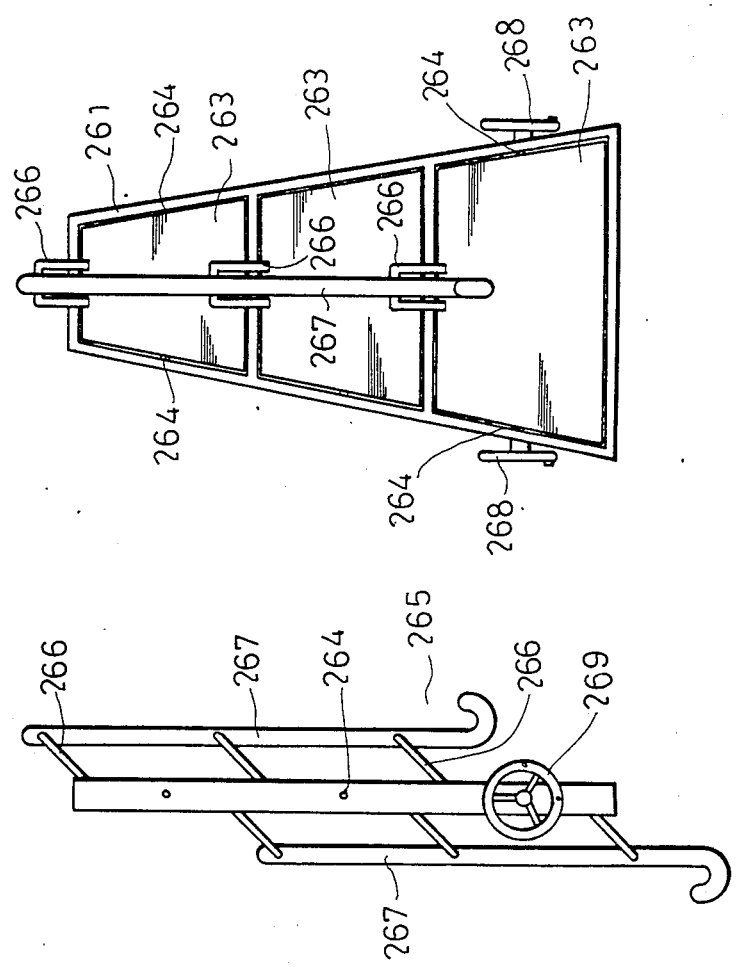
FIG. 5 is an elevational view of an alternative example of the revolving blades for the preferred embodiment shown in FIG. 1.

Referring to FIG. 5, there is shown an alternative example of a preferred structure of the revolving blades 26 according to this invention. Since the windmill apparatus of this invention is usually placed on a open area for being driven by wind, strong winds, such as hurricanes or typhoons, have to be taken into consideration in building the revolving blades 26 to meet the requirement. The structure of the revolving blades 26 in the alternative example includes: a frame body 261 having a plurality of spaces 262 vertically formed therein; a plurality of plates 263 each having a pair of dowel pins 264 respectively protruding on the opposing vertical sides thereof movably engaged with the frame member 261 in the respective spaces 262 through the dowel pins 264; a pair of linkages 265 separately installed on the opposing sides of the frame member 261 and located at a place equally matched with each other, and each of the linkages 265 including a pair of attaching arms 266 symmetrically fixed on an upper and a lower sides of each plate 263 at one end and located at an angle about 45 degrees to the respective sides, and a pair of draw bars 267 movably connected to another end of the attaching arms 266; and a pair of hand wheels 268 fixed at a dowel pin 264 of the lower plate 263 over the opposing sides of the frame 261 so as to effect integrated movement with the plate 263, and each of the hand wheels 268 having a pair of pin holes 269 vertically formed therein for being used to secure the hand wheels 268 on the frame 261 with cotter pins or screws for keeping the plates 263 in closed position in the frame body 261 during normal condition. In addition, a brake mechanism (not shown) may be installed beside the main shaft 21 for holding the first main-shaft sleeve 211 in stationary position when the windmill apparatus is ceased running during an occasion such as in a huricane.

Figure 7:
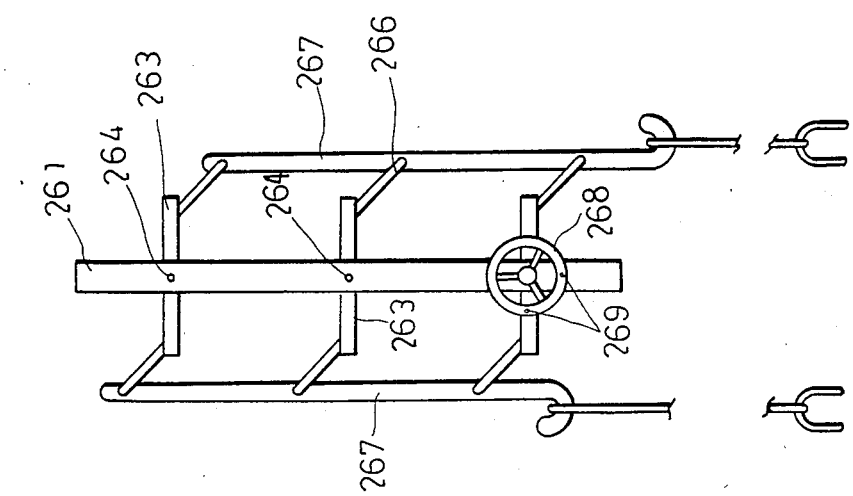
FIG. 7 is an expanded side view of the revolving blades shown in FIG. 5.
Figure 6:
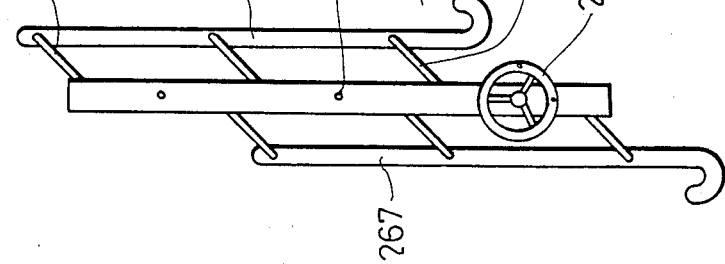
FIG. 6 is a side view of the revolving blades shown in FIG. 5.

In normal running condition, the hand wheels 268 are fixed on the frame 261, as shown in FIG. 6, and all the plates 263 are arrayed as a single revolving blade 26 (as shown in FIG. 2). During a special occasion such as in the approaching of a typhoon, after the brake mechanism is set to stop the running of the main shaft 21, by turning the hand wheels 268 90 degrees after the cotter pins are removed from the secured position, the linkages 265, together with the plates 263 in the frame 261 will also be also shifted 90 degrees and become horizontal, as shown in FIG. 7, and then, the hand wheels 268 are fixed in position with the cotter pins. In order to ensure the stability of the windmill apparatus, the draw bars 267 are also tied down with cords. In this condition, as all the plates 263 are kept at a level position, their wind receiving surfaces are reduced to a minimal state therein not suffering strong wind action.

It shall be appreciated that since the arrangement between the attaching lugs 266 and the plates 263 is made at a 45-degree relationship, operation of the hand wheels 268 can be easily performed for protecting the windmill apparatus.

As can be seen in the preferred embodiment described and illustrated hereinbefore, the present invention resides in the following features:

(1) A configuration of upright revolving-shaft type blades are adapted for effectively using wind force and reducing the manufacturing cost;

(2) With direction control device, the revolving blades can be timely and accurately adjusted in keeping with the directional change of wind; meanwhile, one of the revolving blades is always facing the wind with its edge side in rotation; and (3) A safety arrangement is provided for protecting the windmill apparatus against violent winds.

While a preferred embodiment has been illustrated and described, it is apparent that many changes and modifications may be made in the general construction and arrangement of the invention without departing from the spirit and scope thereof, and it is therefore desired that the invention be not limited to the exact disclosure but only to the extent of the appended claims.

What is claimed is:

1. A windmill apparatus comprising:
   a frame body structure adapted to be positioned on a flat top surface of a construction such as a building;
   a main shaft vertically fixed in a middle position of said frame body structure;
   a first main-shaft sleeve rotatably coupled with a lower portion of said main shaft for being driven to rotate around said main shaft;
   a belt pulley fixedly connected at a lower end of said first main-shaft sleeve for providing a driving froce therefrom along with said first main-shaft sleeve;
   a rotating means having a revolving arrangement vertically disposed therein rotatably installed around said first main-shaft sleeve within a lower open portion of said frame body structure for being driven to rotate by wind along with said first main-shaft sleeve;
   a second main-shaft sleeve with a first gear fixed at a lower end thereof movably connected at an upper portion of said main shaft for providing gear transmission therefrom;
   a direction control means installed within an upper closed portion of said frame body structure and rotatably connected to said rotating means through said second main-shaft sleeve for automatically adjusting said revolving arrangement according to wind direction; and
   a wind direction indicating means horizontally disposed on top of said frame body structure and rotatably connected to said direction control means so as to relay wind direction change thereto; whereby, wind force can be effectively utilized with a simplified structure.

2. A windmill apparatus according to claim 1 wherein said rotating means comprises:
   a lower anchoring member horizontally fixed at a lower part of said first main-shaft sleeve;
   an upper anchoring member horizontally fixed at an upper end of said first main-shaft sleeve in connection with the first gear of said second main-shaft sleeve for being rotated along with said lower anchoring member;
   a second and a third gear, of which the number of each gear teeth is identical to that of the first gear, rotatably installed on said upper anchoring member and respectively meshed with the first gear on both sides thereof at a straight line;
   a fourth and a fifth gear, of which the number of gear teeth of each doubles that of the first gear, rotatably installed on both end portions of said upper anchoring member and respectively meshed with said second and third gears at an upwardly inclined position for performing desired rotation thereat; and
   a pair of revolving members vertically disposed between said upper and lower anchoring members around said first main-shaft sleeve, wherein each lower end of said revolving members is rotatably connected to each end part of said lower anchoring member while each upper end of the revolving members is fixedly connected to a respective gear shaft of said fourth and fifth gears; thereby, said revolving members can effectively arrest the wind in performing windmill rotation operation.

3. A windmill apparatus according to claim 1 wherein said direction control device comprises:
   a base member fixed to said frame body structure over said rotation control means;
   a sixth gear fixedly connected to to a top end of said second main-shaft sleeve extending upward through an opening formed in said base member;

a seventh and an eighth gear provided side by side on said base member with said seventh gear meshed with said sixth gear and said eighth gear meshed with said seventh gear, wherein the number of gear teeth of the gears from sixth through eighth is identical to each other;

a counter gear coaxially connected to said eighth gear and meshed with a worm shaft of a driving device provided on said base member;

a pair of insulated blocks each having a pair of electric contact protuberances disposed thereon spacingly installed over a top area of said counter gear with the electric contact protuberances being correspondingly exposed in a gap defined between the insulated blocks and each pair of the electric contact protuberances respectively connected to a positive and a negative terminal of a power supply unit provided on said base member; and a moving member, having a pair of conductive pieces separately provided therein and electrically connected to a positive and a negative terminal of the driving device, movably disposed over a top area of said insulated blocks with the conductive pieces vertically located in the gap between said insulated blocks in line with the electric contact protuberances so as to make electrical contact and start the driving device for adjusting said revolving blades of said rotation control means in accordance with wind direction change.

4. A windmill apparatus according to claim 1 wherein said wind direction indicating means comprises:

a supporting member horizontally fixed on a top part of said frame body structure at one end;

a shaft member vertically and rotatably engaged with and through another end of said supporting member, said shaft member having a lower end connected to the moving member of said rotating control means and an upper end extending over the top part of said frame body structure; and a wind indicating member horizontally fixed on the upper end of said shaft member; so that when the wind indicating member is moved to change its direction by wind, said shaft member will be turned to move said moving member for making electrical contact accordingly.

5. A windmill apparatus according to claim 2 wherein each of said revolving members comprises:

a frame body having a plurality of spaces vertically formed therein;

a plurality of plates, each having a pair of dowel pins respectively protruding at opposing sides thereof, movably engaged with said frame body in said spaces through said dowel pins;

a pair of linkages, each of which includes a pair of attaching arms symmetrically fixed on an upper end and a lower end of each said plates at one end and respectively located at an angle about 45 degrees to respective sides of said plates, and a pair of draw bars movably connected to another end of each said attaching arms, separately installed on opposing sides of said frame body; and a pair of hand wheels respectively connected at an outer side of said frame body through a dowel pin of one of said plates positioned at a lower space in conjunction with said linkages so as to effect integrated movement with said plates; so that, by operating said hand wheels, all said plates can be turned 90 degrees to said frame body for safety purpose during violent wind condition.

6. A windmill apparatus according to claim 5 wherein each of said hand wheels having a pair of pin holes vertically formed therein for being used to secure said hand wheels on said frame body so as to keep said plates in closed position during normal condition.

7. A windmill apparatus according to claim 5 further comprises a brake mechanism installed in conjunction with said main shaft so as to hold the windmill apparatus in firmly stationary condition when the latter is prevented from operation during an occasion such as a huricane.

* * * * *